(12) United States Patent
Zheng et al.

(10) Patent No.: US 12,058,550 B2
(45) Date of Patent: Aug. 6, 2024

(54) CELL MEASUREMENT METHOD AND APPARATUS

(71) Applicant: HUAWEI TECHNOLOGIES CO., LTD., Guangdong (CN)

(72) Inventors: Lili Zheng, Shanghai (CN); Hongping Zhang, Shenzhen (CN); Qinghai Zeng, Shanghai (CN); Xingxing Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 342 days.

(21) Appl. No.: 17/670,566

(22) Filed: Feb. 14, 2022

(65) Prior Publication Data

US 2022/0167200 A1    May 26, 2022

Related U.S. Application Data

(63) Continuation of application No. PCT/CN2020/108810, filed on Aug. 13, 2020.

(30) Foreign Application Priority Data

Aug. 15, 2019  (CN) .......................... 201910755809.8

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0048* (2013.01); *H04W 24/08* (2013.01); *H04W 68/005* (2013.01)

(58) Field of Classification Search
None
See application file for complete search history.

(56) References Cited

U.S. PATENT DOCUMENTS

2013/0337809 A1   12/2013  Gude et al.
2018/0332561 A1   11/2018  Da Silva et al.
(Continued)

FOREIGN PATENT DOCUMENTS

CN      106559776 A    4/2017
CN      109547174 A    3/2019
(Continued)

OTHER PUBLICATIONS

3GPP TS 38.213 V15.6.0 (Jun. 2019), "3rd Generation Partnership Project; Technical Specification Group Radio Access Network; NR; Physical layer procedures for control(Release 15)," Jun. 2019, 107 pages.
(Continued)

*Primary Examiner* — Walter J Divito
(74) *Attorney, Agent, or Firm* — Fish & Richardson P.C.

(57) ABSTRACT

Example cell measurement methods and apparatus are described. One example method includes obtaining, by a first network device, a first paging parameter of a cell served by a second network device. The first paging parameter is used to indicate a first time domain position at which a terminal device monitors a paging message from the second network device. The first network device sends a reference
(Continued)

signal based on the first paging parameter. A time domain position of the reference signal is determined based on the first time domain position.

15 Claims, 5 Drawing Sheets

(51) Int. Cl.
  *H04W 24/08* (2009.01)
  *H04W 68/00* (2009.01)

(56) References Cited

U.S. PATENT DOCUMENTS

| | | | |
|---|---|---|---|
| 2019/0150094 A1 | 5/2019 | Liu et al. | |
| 2021/0014824 A1* | 1/2021 | Chen | H04W 68/005 |
| 2021/0105721 A1* | 4/2021 | Xu | H04W 52/0235 |
| 2021/0136725 A1* | 5/2021 | Wu | H04W 72/0453 |

FOREIGN PATENT DOCUMENTS

| | | |
|---|---|---|
| CN | 109842937 A | 6/2019 |
| CN | 110035498 A | 7/2019 |
| CN | 110278603 A | 9/2019 |
| WO | 2016180106 A1 | 11/2016 |

OTHER PUBLICATIONS

Intel Corporation, "Power consumption aspects for UL-based and DL-based measurement in NR," 3GPP TSG RAN WG2 Meeting #95 bis, R2-166899, Kaohsiung, Oct. 10-14, 2016, 7 pages.
Office Action issued in Chinese Application No. 201910755809.8 on Jun. 23, 2021, 8 pages (with English translation).
PCT International Search Report and Written Opinion issued in International Application No. PCT/CN2020/108810 on Nov. 10, 2020, 13 pages (with English translation).
Spreadtrum Communications, "Consideration on NR RRM for UE power saving," 3GPP TSG RAN WG1 Meeting #97, R1-1906376, Reno, USA, May 13-17, 2019, 9 pages.
Vivo, "On UE Power Consumption Reduction in RRM Measurements," 3GPP TSG RAN WG1 Meeting #94bis, R1-1810415, Chengdu, China, Oct. 8-12, 2018, 7 pages.
Vivo, "UE power Consumption Reduction in RRM Measurements," 3GPP TSG RAN WG1 Meeting #95, R1-1813862, Spokane, US, Nov. 12-16, 2018, 8 pages.
Ericsson, "CSI-RS Configuration Transfer," 3GPP TSG-RAN WG3 #101-Bis, R3-185894, Chengdu, China, Oct. 8-12, 2018, 3 pages.
Extended European Search Report issued in European Application No. 20851911.6 on Sep. 6, 2022, 12 pages.
Huawei, HiSilicon, "UE Power Consumption Reduction in RRM Measurements," 3GPP TSG RAN WG1 Meeting #95, R1-1812233, Spokane, USA, Nov. 12-16, 2018, 4 pages.

* cited by examiner

CELL MEASUREMENT METHOD AND APPARATUS

CROSS-REFERENCE TO RELATED APPLICATIONS

This application is a continuation of International Application No. PCT/CN2020/108810, filed on Aug. 13, 2020, which claims priority to Chinese Patent Application No. 201910755809.8, filed on Aug. 15, 2019. The disclosures of the aforementioned applications are hereby incorporated by reference in their entireties.

TECHNICAL FIELD

This application relates to the communication field, and more specifically, to a cell measurement method and apparatus.

BACKGROUND

In a wireless communication system, a terminal device usually has three modes: a radio resource control (RRC) connected mode (RRC_CONNECTED), an RRC idle mode (RRC_IDLE), and an RRC inactive mode (RRC_INACTIVE). When in idle mode or inactive mode, the terminal device cannot directly communicate with a network device. To ensure that the network device can effectively find the terminal device in idle mode/inactive mode, the network device usually periodically sends paging scheduling information to the terminal device in a paging manner, to indicate whether the terminal device should be switched from the idle mode/inactive mode to the connected mode to communicate with the network device. After receiving the paging scheduling information, the terminal device may wake up and enter the connected mode, to send or receive service data.

The terminal device in idle mode/inactive mode wakes up in a paging cycle to monitor a paging message. A moment at which the terminal device wakes up is referred to as a paging occasion (PO). The network device sends the paging message through an air interface at the moment, so that the terminal device receives the paging message at the moment. The behavior of monitoring the paging message by the terminal device requires some power consumption. In addition, the terminal device further needs to wake up at a moment to perform radio resource management (RRM) measurement, which also requires some power consumption. Therefore, a method urgently needs to be provided to reduce power consumption of the terminal device.

SUMMARY

In view of this, this application provides a cell measurement method and apparatus, to help reduce power consumption of a terminal device.

According to a first aspect, a cell measurement method is provided, and includes: A first network device obtains a first paging parameter of a cell served by a second network device. The first paging parameter is used to indicate a first time domain position at which a terminal device monitors a paging message from the second network device. The first network device sends a reference signal based on the first paging parameter. A time domain position of the reference signal is determined based on the first time domain position. Herein, the time domain position of the reference signal needs to be maximally close to the first time domain position, to ensure that the terminal device can both monitor the paging message and perform measurement. This helps reduce power consumption of the terminal device. In other words, in this embodiment of this application, a time difference between a paging position and the time domain position of the reference signal may be maximally reduced, so that the terminal device can both monitor the paging message and perform measurement after waking up once, and the power consumption of the terminal device is reduced.

In a possible implementation, that a first network device obtains a first paging parameter of a cell served by a second network device includes: The first network device receives the first paging parameter from the second network device. Therefore, the first network device may directly receive the first paging parameter sent by the second network device.

In another possible implementation, that a first network device obtains a first paging parameter of a cell served by a second network device includes: The first network device receives the first paging parameter from the terminal device. Therefore, the first network device may receive the first paging parameter reported by the terminal device.

Optionally, before the first network device receives the first paging parameter from the terminal device, the method further includes: The first network device sends configuration information to the terminal device. The configuration information is used to configure the terminal device to report the first paging parameter. Herein, the first network device may preconfigure the terminal device to report the first paging parameter.

Optionally, the configuration information includes an identifier and/or frequency of the cell served by the second network device.

Optionally, the method further includes: The first network device sends a second paging parameter of a cell served by the first network device to the second network device. Herein, the first network device may also notify the second paging parameter of the first network device to the second network device, so that the second network device configures measurement of the terminal device.

Optionally, the method further includes: A distributed unit DU of the first network device sends a second paging parameter of a cell served by the first network device to a centralized unit CU of the first network device. Herein, the DU of the first network device may notify the second paging parameter of the first network device to the CU of the first network device.

According to a second aspect, a cell measurement method is provided, and includes: A second network device generates a first paging parameter of a cell served by the second network device. The first paging parameter is used to indicate a first time domain position at which a terminal device monitors a paging message from the second network device. The second network device sends the first paging parameter to a first network device. The first paging parameter is used by the first network device to send a reference signal based on the first paging parameter, and a time domain position of the reference signal is determined based on the first time domain position. Herein, the second network device sends the first paging parameter to the first network device, so that the first network device sends the reference signal based on the first paging parameter. Herein, the time domain position of the reference signal needs to be maximally close to the first time domain position, to ensure that the terminal device can both monitor the paging message and perform measurement. This helps reduce power consumption of the terminal device.

Optionally, the method further includes: A distributed unit DU of the second network device sends the first paging parameter to a centralized unit CU of the second network device.

Optionally, the method further includes: The second network device receives a second paging parameter of a cell served by the first network device from the first network device.

According to a third aspect, a cell measurement method is provided, and includes: A terminal device obtains a first paging parameter of a cell served by a second network device. The first paging parameter is used to indicate a first time domain position at which the terminal device monitors a paging message from the second network device. The terminal device sends the first paging parameter to a first network device. Therefore, the terminal device may receive the first paging parameter of the cell served by the second network device, to send the first paging parameter to the first network device.

Optionally, before the terminal device sends the first paging parameter to the first network device, the method further includes: The terminal device receives configuration information from the first network device. The configuration information is used to configure the terminal device to report the first paging parameter. Therefore, the terminal device may send the first paging parameter to the first network device based on configuration of the first network device.

Optionally, the configuration information includes an identifier and/or frequency of the cell served by the second network device.

According to a fourth aspect, a cell measurement method is provided, and includes: A distributed unit DU of a first network device sends a first channel state information reference signal (CSI-RS) configuration to a centralized unit CU of the first network device. The CU of the first network device sends the first CSI-RS configuration to a CU of a second network device. Therefore, the DU of the first network device may send the CSI-RS configuration of the first network device to the CU of the first network device.

Optionally, the method further includes: The CU of the first network device receives a second CSI-RS configuration from the CU of the second network device. The CU of the first network device sends the second CSI-RS configuration to the DU of the first network device. Therefore, the CU of the first network device may send the CSI-RS configuration of a cell served by the second network device to the DU of the first network device.

According to a fifth aspect, a cell measurement method is provided, and includes: A first network device determines a configuration of a first additional reference signal. The configuration of the first additional reference signal includes time domain information and/or frequency domain information. The first network device sends the configuration of the first additional reference signal to a second network device. Therefore, the first network device may send the configuration of the first additional reference signal of the first network device to the second network device, so that the second network device configures measurement of a terminal device.

Optionally, the method further includes: A distributed unit DU of the first network device sends the configuration of the first additional reference signal to a centralized unit CU of the first network device.

Optionally, the method further includes: The CU of the first network device receives a configuration of a second additional reference signal from a CU of the second network device. The CU of the first network device sends the configuration of the second additional reference signal to the DU of the first network device.

According to a sixth aspect, a cell measurement method is provided, and includes: A second network device receives a configuration of a first additional reference signal from a first network device. The configuration of the first additional reference signal includes frequency domain information and/or time domain information. In this way, the second network device may configure, with reference to the configuration of the first additional reference channel, a terminal device to measure a neighboring cell.

Optionally, the method further includes: A centralized unit CU of the second network device sends the configuration of the first additional reference signal to a distributed unit DU of the second network device.

Optionally, the method further includes: The distributed unit DU of the second network device sends a configuration of a second additional reference signal to the centralized unit CU of the second network device.

According to a seventh aspect, a communication apparatus is provided. The communication apparatus includes a module configured to perform the method according to any one of the first aspect or the possible implementations of the first aspect; includes a module configured to perform the method according to any one of the fourth aspect or the possible implementations of the fourth aspect; or includes a module configured to perform the method according to any one of the fifth aspect or the possible implementations of the fifth aspect.

According to an eighth aspect, a communication apparatus is provided. The communication apparatus includes a module configured to perform the method according to any one of the second aspect or the possible implementations of the second aspect; or includes a module configured to perform the method according to any one of the sixth aspect or the possible implementations of the sixth aspect.

According to a ninth aspect, a communication apparatus is provided. The communication apparatus includes a module configured to perform the method according to any one of the third aspect or the possible implementations of the third aspect.

According to a tenth aspect, a communication apparatus is provided, and includes a processor and an interface circuit. The interface circuit is configured to: receive a signal from a communication apparatus other than the communication apparatus and transmit the signal to the processor, or send a signal from the processor to the communication apparatus other than the communication apparatus. The processor is configured to implement the method according to any one of the first aspect or the possible implementations of the first aspect by using a logic circuit or by executing code instructions. Alternatively, the processor is configured to implement the method according to any one of the fourth aspect or the possible implementations of the fourth aspect by using a logic circuit or by executing code instructions. Alternatively, the processor is configured to implement the method according to any one of the fifth aspect or the possible implementations of the fifth aspect by using a logic circuit or by executing code instructions.

According to an eleventh aspect, a communication apparatus is provided, and includes a processor and an interface circuit. The interface circuit is configured to: receive a signal from a communication apparatus other than the communication apparatus and transmit the signal to the processor, or send a signal from the processor to the communication apparatus other than the communication apparatus. The processor is configured to implement the method according to any one of the second aspect or the possible implementations of the second aspect by using a logic circuit or by executing code instructions. Alternatively, the processor is configured to implement the method according to any one of the sixth aspect or the possible implementations of the sixth aspect by using a logic circuit or by executing code instructions.

According to a twelfth aspect, a communication apparatus is provided, and includes a processor and an interface circuit. The interface circuit is configured to: receive a signal from a communication apparatus other than the communication apparatus and transmit the signal to the processor, or send a signal from the processor to the communication apparatus other than the communication apparatus. The processor is configured to implement the method according to any one of the first aspect or the possible implementations of the first aspect by using a logic circuit or by executing code instructions. Alternatively, the processor is configured to implement the method according to any one of the third aspect or the possible implementations of the third aspect by using a logic circuit or by executing code instructions.

According to a thirteenth aspect, a computer-readable storage medium is provided. The computer-readable storage medium stores a computer program or instructions. When the computer program or the instructions are executed, the method according to any one of the first aspect or the possible implementations of the first aspect is implemented; the method according to any one of the second aspect or the possible implementations of the second aspect is implemented; the method according to any one of the third aspect or the possible implementations of the third aspect is implemented; the method according to any one of the fourth aspect or the possible implementations of the fourth aspect is implemented; the method according to any one of the fifth aspect or the possible implementations of the fifth aspect is implemented; or the method according to any one of the sixth aspect or the possible implementations of the sixth aspect is implemented.

According to a fourteenth aspect, a computer program product including instructions is provided. When the instructions are run, the method according to any one of the first aspect or the possible implementations of the first aspect is implemented; the method according to any one of the second aspect or the possible implementations of the second aspect is implemented; the method according to any one of the third aspect or the possible implementations of the third aspect is implemented; the method according to any one of the fourth aspect or the possible implementations of the fourth aspect is implemented; the method according to any one of the fifth aspect or the possible implementations of the fifth aspect is implemented; or the method according to any one of the sixth aspect or the possible implementations of the sixth aspect is implemented.

According to a fifteenth aspect, a communication chip is provided. The communication chip stores instructions. When the instructions are run on a computer device, the communication chip is enabled to perform the method according to any possible implementation of any one of the first aspect to the sixth aspect.

According to a sixteenth aspect, a communication system is provided. The communication system includes the communication apparatus according to the seventh aspect, the communication apparatus according to the eighth aspect, and the communication apparatus according to the ninth aspect.

According to a seventeenth aspect, a communication system is provided. The communication system includes the communication apparatus according to the tenth aspect, the communication apparatus according to the eleventh aspect, and the communication apparatus according to the twelfth aspect.

DESCRIPTION OF EMBODIMENTS

The following describes technical solutions in this application with reference to accompanying drawings.

In the embodiments of this application, "a plurality of" may be understood as "at least two" or "two or more"; "a plurality of items" may be understood as "at least two items" or "two or more items".

The technical solutions in the embodiments of this application may be applied to various communication systems, for example, a long term evolution (LTE) system, a new radio (NR) system in a 5th generation (5G) mobile communication system, and a future mobile communication system.

Figure 1:
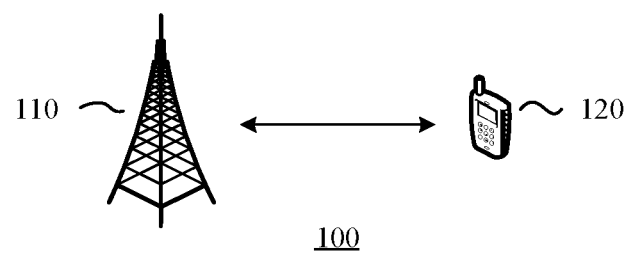
FIG. 1 is a schematic diagram of a communication system used in an embodiment of this application.

FIG. 1 is a schematic diagram of a communication system 100 used in an embodiment of this application. As shown in the figure, the communication system 100 may include at least one network device such as a network device 110 shown in FIG. 1. The communication system 100 may further include at least one terminal device such as a terminal device 120 shown in FIG. 1. The network device 110 and the terminal device 120 may communicate with each other through a radio link.

Figure 2:
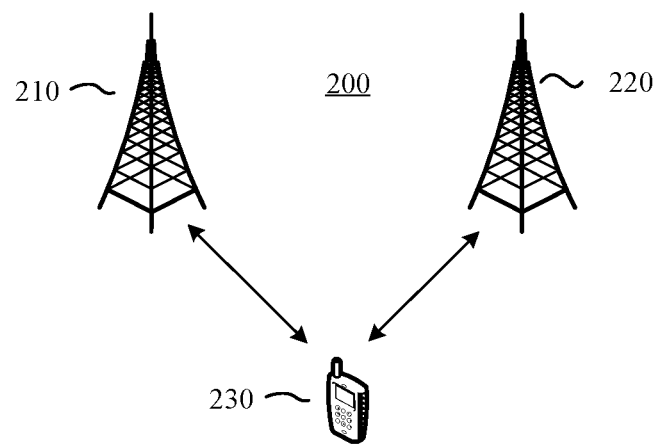
FIG. 2 is another schematic diagram of a communication system used in an embodiment of this application.

FIG. 2 is another schematic diagram of a communication system 200 used in an embodiment of this application. As shown in the figure, the communication system 200 may include at least two network devices such as network devices 210 and 220 shown in FIG. 2. The communication system 200 may further include at least one terminal device such as a terminal device 230 shown in FIG. 2. The terminal device 230 may establish radio links to the network device 210 and the network device 220 by using a dual connectivity (DC) technology or a multi-connectivity technology. The network device 210 may be, for example, a master evolved NodeB, and the network device 220 may be, for example, a secondary evolved NodeB. In this case, the network device 210 is a network device initially accessed by the terminal device 230, and is responsible for radio resource control (RRC) communication with the terminal device 230. The network device 220 may be added during RRC reconfiguration, and is configured to provide an additional radio resource.

In addition, as shown in FIG. 2, one of the two network devices, for example, the network device 210, may be responsible for exchanging radio resource control messages with the terminal device and responsible for interacting with a core network control plane entity. In this case, the network device 210 may be referred to as a master node (MN). For example, the master node may be the MeNB or an MgNB, and is not limited thereto. In this case, the other network device such as the network device 220 may be referred to as a secondary node (SN). For example, the secondary node may be the secondary evolved NodeB (SeNB) or (secondary next generation NodeB, SgNB), and is not limited thereto. A master cell group (MCG) may include a plurality of serving cells in the master node, and includes one primary cell (PCell) and one or more optional secondary cells (secondary cell, SCell). A secondary cell group (SCG) may include a plurality of serving cells in the secondary node, and includes one primary secondary cell (PSCell) and one or more optional SCells. The serving cell is a cell configured by a network for the terminal device to perform uplink and downlink transmission.

Similarly, the terminal device may alternatively have communication connections to a plurality of network devices simultaneously and may send and receive data. One of the plurality of network devices may be responsible for exchanging radio resource control messages with the terminal device and responsible for interacting with a core network control plane entity. In this case, the network device may be referred to as an MN, and other network devices may be referred to as SNs.

Certainly, the network device 220 may alternatively be a master evolved NodeB or a master node, and the network device 210 may alternatively be a secondary evolved NodeB or a secondary node. This is not limited in this application. In addition, for ease of understanding only, the figure shows a case in which the two network devices are wirelessly connected to the terminal device. However, this should not constitute any limitation on a scenario to which this application is applicable. The terminal device may further establish radio links to more network devices.

A plurality of antennas may be configured for each communication device such as the network device 110 or the terminal device 120 in FIG. 1, or the network device 210, the network device 220, or the terminal device 230 in FIG. 2. The plurality of antennas may include at least one transmit antenna configured to send a signal and at least one receive antenna configured to receive a signal. In addition, the communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

The network device in the embodiments of this application is an access device that is used by the terminal device to access the mobile communication system in a wireless manner. The network device may be a NodeB, an evolved NodeB (eNB), a next generation NodeB (gNB) in a 5G mobile communication system, a transmission point, a base station in a future mobile communication system, an access node in a wireless fidelity (Wi-Fi) system, or an antenna panel or a group of antenna panels (including a plurality of antenna panels) of a base station in a 5G system; or may be a network node that constitutes the gNB or the transmission point, for example, a baseband unit (BBU), a distributed unit (DU), a centralized unit (CU), or a centralized unit control plane (CU-CP) and a centralized unit user plane (CU-UP). A specific technology and a specific device form that are used by the network device are not limited in the embodiments of this application. In some deployment, the gNB may include the CU and the DU. The CU and the DU may be understood as division of a base station from a perspective of logical functions. The CU and the DU may be physically separated or deployed together. One CU may be connected to one DU, or a plurality of DUs may share one CU. This can reduce costs and facilitate network expansion. The CU implements some functions of the gNB; the DU implements some functions of the gNB. For example, the CU is responsible for processing anon-real-time protocol and service, to implement functions of a radio resource control (RRC) layer and a packet data convergence protocol (PDCP) layer. The DU is responsible for processing a physical layer protocol and a real-time service, to implement functions of a radio link control (RLC) layer, a media access control (MAC) layer, and a physical (PHY) layer.

It should be understood that division of the CU and the DU may be performed based on the foregoing protocol stack. The protocol stack division manner is not completely limited in the embodiments of this application, and there may be another division manner. For details, refer to TR 38.801 v14.0.0. For example, the CU or the DU may have functions of more protocol layers through division. For example, the CU or the DU may alternatively have some processing functions of protocol layers through division. In a design, some functions of the RLC layer and functions of a protocol layer above the RLC layer are disposed on the CU, and remaining functions of the RLC layer and functions of a protocol layer below the RLC layer are disposed on the DU. In another design, functions of the CU or the DU may alternatively be divided based on a service type or another system requirement. For example, division is performed based on a latency, functions whose processing time needs to satisfy a latency requirement are disposed on the DU, and functions whose processing time does not need to satisfy the latency requirement are disposed on the CU. In another design, the CU may alternatively have one or more functions of a core network. One or more CUs may be disposed in a centralized manner or a separated manner. For example, the CUs may be disposed on a network side for ease of centralized management. The DU may have a plurality of radio frequency functions, or the radio frequency functions may be disposed remotely.

The CU and the DU are connected through an F1 interface. The CU indicates that the gNB is connected to the core network through an Ng interface. Further, the centralized unit CU may be further divided into a control plane (CU-CP) and a user plane (CU-UP). The CU-CP is responsible for a control plane function, and mainly includes RRC and a packet data convergence protocol control plane (packet data convergence protocol control, PDCP-C). The PDCP-C is mainly responsible for at least one function in data encryption and decryption, integrity protection, data transmission, and the like on the control plane. The CU-UP is responsible for a user plane function, and mainly includes a service data adaptation protocol (SDAP) and a packet data convergence protocol user plane (packet data convergence protocol user, PDCP-U). The SDAP is mainly responsible for processing data of the core network and mapping a flow to a bearer. The PDCP-U layer is mainly responsible for at least one function in encryption and decryption, integrity protection, header compression, serial number maintenance, data transmission, and the like on a data plane. The CU-CP is connected to the CU-UP through an E1 interface. The CU-CP indicates that the gNB is connected to the core network through the Ng interface. The CU-CP is connected to the DU through F1-C (a control plane). The CU-UP is connected to the DU through F1-U (a user plane). Certainly, in another possible implementation, the PDCP-C is alternatively on the CU-UP.

The gNB may further include an active antenna unit (AAU). The AAU implements some physical layer processing functions, radio frequency processing, and a function related to an active antenna. Information at the RRC layer is eventually converted into information at the PHY layer, or is converted from the information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, a CU-CP node, a CU-UP node, and an AAU node. In addition, the CU may be used as a network device in an access network, or may be used as a network device in the core network (CN). This is not limited in this application.

The terminal device may also be referred to as a terminal, user equipment (UE), a mobile station (MS), a mobile terminal (MT), or the like. The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote surgery (remote medical surgery), a wireless terminal in a smart grid, a wireless terminal in transportation safety, a wireless terminal in a smart city, a wireless terminal in a smart home, or the like. A specific technology and a specific device form that are used by the terminal device are not limited in the embodiments of this application.

The network device and the terminal device may be deployed on land, and includes an indoor or outdoor device, a handheld device, or a vehicle-mounted device; may be deployed on water; or may be deployed on an aircraft, a balloon, and a satellite in the air. Application scenarios of a radio access network device and the terminal device are not limited in the embodiments of this application.

Communication between the network device and the terminal device and communication between terminal devices may be performed by using a licensed spectrum, an unlicensed spectrum, or both the licensed spectrum and the unlicensed spectrum. The communication between the network device and the terminal device and the communication between the terminal devices may use a spectrum below 6 gigahertz (GHz), a spectrum above 6G, or both the spectrum below 6G and the spectrum above 6G. Spectrum resources used between the radio access network device and the terminal device are not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). An operating system may be any one or more computer operating systems that implement service processing by using a process, for example, a Linux operating system, a Unix operating system, an Android operating system, an iOS operating system, or a windows operating system. The application layer includes applications such as a browser, an address book, word processing software, and instant messaging software. In addition, a specific structure of an execution body of a method provided in the embodiments of this application is not specially limited in the embodiments of this application provided that a program that records code of the method provided in the embodiments of this application can be run to perform communication according to the method provided in the embodiments of this application. For example, the execution body of the method provided in the embodiments of this application may be the terminal device, the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

For ease of understanding, some terms or concepts in the embodiments of this application are briefly described herein.

Content of a paging message is sent by the network device to the terminal device at a physical downlink shared channel (PDSCH) resource position. A PDSCH resource is indicated by scrambling a physical downlink control channel (PDCCH) by using a paging radio network temporary identifier (paging radio network temporary identity, P-RNTI). To obtain the paging message, the terminal device first needs to periodically wake up to monitor the PDCCH channel scrambled by using the P-RNTI, then parses downlink control information (DCI) to further obtain a time-frequency position of a PDSCH channel, and finally parses the content of the paging message at the corresponding position of the PDSCH channel.

A frequency domain resource occupied by the paging message is specified by the PDCCH scrambled by using the P-RNTI. In time domain, the terminal device attempts to receive the paging message on a paging occasion (PO) of a specific frame (paging frame, PF) in a paging cycle. The PF is a radio frame, and the radio frame includes one or more POs.

An additional reference signal (additional RS) is a reference signal provided by a base station and different from an existing reference signal in Release 15, and is used to assist the terminal device in performing one or more of the following behavior: precise synchronization, channel/beam tracking, CSI/RRM measurement, and the like. The additional reference signal may be used for discontinuous reception (DRX), bandwidth part (BWP) switching, fast SCell activation, PDCCH detection reduction, the RRM measurement, and/or the like. The PO is a set of PDCCH monitoring occasions, and may include a plurality of slots (or subframes or orthogonal frequency division multiplexing (OFDM)

symbols). On the PO, there may be the PDCCH scrambled by using the P-RNTI and indicating the paging message. When the DRX is used, the terminal device needs to detect only one PO in each DRX cycle. In other words, for each terminal device, only one PO in each paging cycle may be used to send paging. For UE in idle mode/inactive mode, the DRX cycle and the paging cycle are a same concept.

Paging parameters include a paging frame number, the paging cycle, a paging density, a quantity of paging frames, a quantity of paging occasions in the paging frame, and other possible parameters. For example, the paging parameter may include one or more of the following: N, Ns, firstPDCCH-MonitoringOccasionOfPO, PF_offset, the length of a default DRX cycle, and the like. N represents a quantity of PFs in a cycle, and Ns represents the quantity of POs in the PF.

For firstPDCCHMonitoringOccasionOfPO, the information element (IE) is used to determine a start position of the PO. defaultPagingCycle means a default paging cycle, and can be expressed as "T". For example, T represents the DRX cycle of the UE.

It should be understood that paging-related content is merely briefly described herein. For details of explanations or concepts not involved, refer to descriptions in the existing protocols TS 38.213, TS 38.304, TS 38.331, and the like. For brevity, details are not described herein again.

Additional resource: According to TR 38.340, using the additional resource for the RRM measurement helps save power of the terminal device. The additional resource is a resource, to be specific, an introduced additional reference signal for the RRM measurement in addition to an existing synchronization signal block (SSB) for measurement and an existing channel state information reference signal (CSI-RS) for measurement. Optionally, the additional reference signal may be a CSI-RS, a secondary synchronization signal (SSS), an SSB, a demodulation reference signal (DMRS), or the like. The additional resource is applicable to a terminal device in idle/inactive/connected mode.

In the embodiments of this application, unless otherwise stated or there is a logic conflict, terms and/or descriptions between different embodiments are consistent and may be mutually referenced, and technical features in the different embodiments may be combined based on an internal logical relationship thereof, to form a new embodiment.

In the embodiments of this application, network devices exchange paging parameters, so that a paging parameter of a neighboring cell can be considered when a measurement resource is configured, to minimize a time difference between a time domain position corresponding to a reference signal and a time domain position corresponding to the paging message. In this way, the terminal device can both monitor the paging message and measure the reference signal after waking up once. This helps reduce power consumption of the terminal device.

Figure 3:
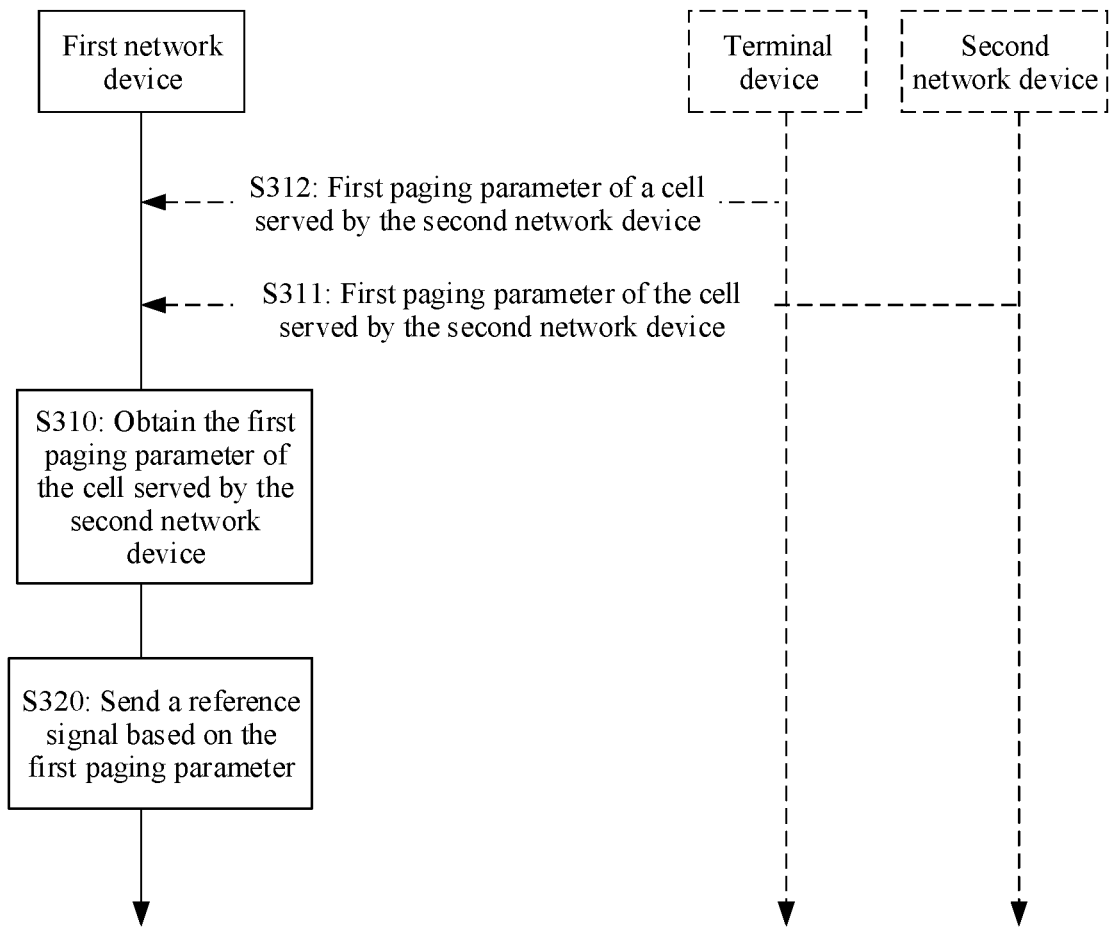
FIG. 3 is a schematic flowchart of a cell measurement method according to an embodiment of this application.

FIG. 3 is a schematic flowchart of a cell measurement method 300 according to an embodiment of this application. As shown in FIG. 3, the method 300 includes the following steps.

S310: A first network device obtains a first paging parameter of a cell served by a second network device, where the first paging parameter is used to indicate a first time domain position at which a terminal device monitors a paging message from the second network device.

A cell served by the first network device and the cell served by the second network device are neighboring cells. For example, for the cell served by the first network device, the cell served by the second network device is a neighboring cell of the cell served by the first network device. For another example, for the second network device, the cell served by the first network device is a neighboring cell of the cell served by the second network device.

It should be understood that the first network device and the second network device may mutually obtain paging parameters corresponding to each other. For example, the second network device may also obtain a second paging parameter of the cell served by the first network device. An example in which the first network device obtains the first paging parameter of the cell served by the second network device is used for description herein.

The first paging parameter may be used to directly or indirectly indicate the first time domain position at which the terminal device monitors the paging message from the second network device. For example, the first time domain position is a paging occasion PO of the terminal device. If a direct indication manner is used, the first paging parameter may directly indicate the first time domain position. If an indirect indication manner is used, content included in the first paging parameter may be used to calculate the first time domain position.

For example, the first paging parameter may include one or more of the following: N, Ns, firstPDCCH-MonitoringOccasionOfPO, PF_offset, the length of a default DRX cycle, and other information. Herein, for explanations of the parameters, refer to the foregoing descriptions. For brevity, details are not described herein again. The first paging parameter is associated with the cell served by the second network device.

It should be understood that the content included in the first paging parameter is merely described as an example, and does not constitute any limitation on this embodiment of this application. Actually, the first paging parameter may alternatively include another paging-related parameter.

S320: The first network device sends a reference signal based on the first paging parameter, where a time domain position of the reference signal is determined based on the first time domain position. Herein, a distance between the first time domain position and the time domain position of the reference signal is relatively small.

During specific implementation, the first network device may make the time domain position used to send the reference signal maximally close to the first time domain position, so that the terminal device can both monitor the paging message and measure the reference signal after waking up once. This helps reduce power consumption of the terminal device. It should be understood that, in this embodiment of this application, a sequence of "monitoring the paging message" and "measuring the reference signal" after the terminal device wakes up once is not specifically limited. "Monitoring the paging message" may be performed before or after "measuring the reference signal", or the two steps may be performed simultaneously.

In this embodiment of this application, the first network device may receive the first paging parameter from the second network device or the terminal device. The following separately provides descriptions.

Optionally, in an implementation, the first paging parameter may be sent by the second network device to the first network device. The second network device sends the first paging parameter to the first network device. Correspondingly, S310 includes S311: The first network device receives the first paging parameter from the second network device. Herein, the first network device may directly receive the first paging parameter sent by the second network device through an X2 interface or an Xn interface.

Optionally, in another implementation, the first paging parameter may be sent by the terminal device to the first network device. The terminal device sends the first paging parameter to the first network device. Correspondingly, S310 includes S312: The first network device receives the first paging parameter from the terminal device. Herein, the first network device may preconfigure the terminal device to report the paging parameter.

Optionally, before the first network device receives the first paging parameter from the terminal device, the first network device sends configuration information to the terminal device. The configuration information is used to configure the terminal device to report the first paging parameter. Optionally, the configuration information includes an identifier and/or frequency of the cell served by the second network device.

For example, the first network device sends an RRC message to the terminal device, to configure the terminal device to report the first paging parameter of the cell served by the second network device. The RRC message includes information such as an identifier of a target neighboring cell (where the cell served by the second network device may be used as the target neighboring cell) and/or SSB frequency of the target neighboring cell. After receiving the RRC message from the first network device, the terminal device reads a broadcast message, for example, an SIB 1, of the target neighboring cell, to obtain the first paging parameter. The terminal device sends the first paging parameter of the cell served by the second network device to the first network device by using the RRC message.

The first network device may further send the second paging parameter of the cell served by the first network device to the second network device. For example, the first paging parameter may alternatively include N, Ns, firstPDCCH-MonitoringOccasionOfPO, PF_offset, and the length of default DRX cycle. The second paging parameter is associated with the cell served by the first network device.

Optionally, the method 300 further includes: A DU of the first network device sends the second paging parameter of the cell served by the first network device to a CU of the first network device. For the first network device, the second paging parameter is a paging parameter of the cell of the first network device. The DU of the first network device may send the second paging parameter to the CU of the first network device. In this way, the CU of the first network device may send the second paging parameter of the cell of the first network device to a CU of the second network device, to assist the second network device in configuring, for the terminal device, an additional resource used to measure a neighboring cell (where for example, the neighboring cell of the cell served by the second network device may be the cell served by the first network device).

Similarly, the method 300 further includes: A distributed unit DU of the second network device sends the first paging parameter to the centralized unit CU of the second network device. For the second network device, the first paging parameter is a paging parameter of the cell of the second network device. The DU of the second network device may also send the first paging parameter to the CU of the second network device. In this way, the CU of the second network device may send the first paging parameter to the CU of the first network device, to assist the first network device in configuring, for the terminal device, an additional resource used to measure a neighboring cell (where for example, the neighboring cell of the cell served by the first network device may be the cell served by the second network device).

For ease of understanding, the following provides descriptions with reference to specific examples. Herein, descriptions are provided by using an example in which the cell served by the first network device is a cell 1, UE 1 camps on the cell 1, and the first network device corresponds to a CU 1 and a DU 1; and the cell served by the second network device is a cell 2, UE 2 camps on the cell 2, and the second network device corresponds to a CU 2 and a DU 2.

For example, the DU 1 exchanges the second paging parameter of the cell 1 to the CU 1 through an F1 interface, and the CU 1 exchanges the second paging parameter to the CU 2 through the Xn interface or the X2 interface. After obtaining the second paging parameter of the cell 1, when configuring the additional resource used to measure the neighboring cell (for example, the cell 1), the CU 2 makes a time domain position of the additional resource maximally close to a paging occasion of the neighboring cell. Optionally, the CU 2 may also obtain paging parameters of a plurality of other neighboring cells such as a cell 3 and a cell 4, and then configure corresponding measurement resources. Optionally, the CU 2 may also exchange the configured additional resource to the CU 1 through the Xn interface or the X2 interface. The CU 1 may send a measurement configuration (including the additional resource configured by the CU 2) to the UE 1, so that the UE 1 measures the cell 2 based on the measurement configuration.

This application further provides an embodiment. Network devices may exchange configurations of additional reference signals, to configure a terminal device to measure an additional reference signal of a neighboring cell. The configurations of the additional reference signals are used by the terminal device to perform RRM measurement. It should be understood that the embodiments of this application may be used separately or in combination. This is not limited. An additional reference signal (additional RS) in the embodiments of this application is an additional reference signal configured for UE to save power, and may also be referred to as a temporary RS or have another name. This is not limited in the embodiments of this application.

Figure 4:
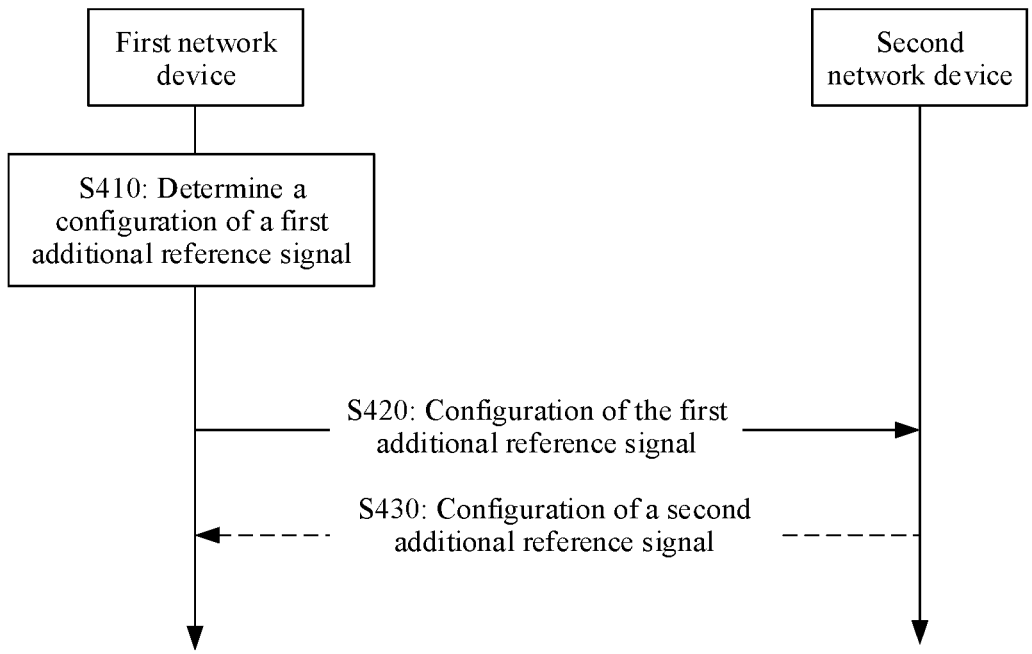
FIG. 4 is a schematic flowchart of a cell measurement method according to another embodiment of this application.

FIG. 4 is a schematic flowchart of a cell measurement method 400 according to another embodiment of this application. As shown in FIG. 4, the method 400 includes the following steps.

S410: A first network device determines a configuration of a first additional reference signal, where the configuration of the first additional reference signal includes time domain information and/or frequency domain information.

For example, the configuration of the first additional reference signal includes one or more of the following: frequency domain information of the additional reference signal (for example, frequency, a subcarrier spacing, a start PRB (physical resource block), and a total quantity of occupied PRBs), time domain information of the additional reference signal (for example, a sending cycle, a sending start time (where the sending start time may be represented by using an offset offset), and sending duration, a density, and the like.

S420: The first network device sends the configuration of the first additional reference signal to a second network device. Correspondingly, the second network device receives the configuration of the first additional reference signal. The second network device may configure, with reference to the configuration of the first additional reference signal, a terminal device to perform measurement.

Optionally, the first network device may indicate that the first additional reference signal is a reference signal used to save power of the terminal device.

Optionally, the method 400 further includes: A DU of the first network device sends the configuration of the first additional reference signal to a CU of the first network device. Specifically, the DU of the first network device may notify the configuration of the first additional reference signal of a cell of the first network device to the CU of the first network device through an F1 interface, so that the CU of the first network device can send the configuration of the first additional reference signal to a neighboring cell, for example, a CU of the second network device. In this way, the CU of the second network device can be assisted in performing measurement configuration of an additional reference signal on UE.

Similarly, the second network device may also send a configuration of a second additional reference signal to the first network device. The configuration of the second additional reference signal includes frequency domain information and/or time domain information. Optionally, the method 400 further includes: S430: The second network device sends the configuration of the second additional reference signal to the first network device. Specifically, the CU of the second network device sends the configuration of the second additional reference signal to the CU of the first network device. Correspondingly, the CU of the first network device receives the configuration of the second additional reference signal from the CU of the second network device.

Optionally, the CU of the first network device sends the configuration of the second additional reference signal to the DU of the first network device. Herein, for the first network device, the configuration of the second additional reference signal is a configuration of an additional reference signal of a neighboring cell of the cell served by the first network device. The CU of the first network device may send the configuration of the additional reference signal of the neighboring cell to the DU of the first network device. When generating a measurement gap configuration, the DU of the first network device may consider the configuration of the additional reference signal of the neighboring cell. The DU of the first network device may send the generated gap configuration to the CU of the first network device. For a process in which the DU of the first network device generates the gap configuration, refer to an existing means. To avoid redundancy, details are not described herein again.

Similarly, the CU of the second network device may also send the configuration of the first additional reference signal to a DU of the second network device. Herein, for the second network device, the configuration of the first additional reference signal is a configuration of an additional reference signal of a neighboring cell of a cell served by the second network device.

Similarly, the DU of the second network device may send the configuration of the second additional reference signal to the CU of the second network device. Herein, for the second network device, the configuration of the second additional reference signal is a configuration of an additional reference signal of the cell of the second network device.

For ease of understanding, the following provides descriptions with reference to a specific example. Herein, descriptions are provided by using an example in which the cell served by the first network device is a cell 1, the cell 1 is a serving cell of UE 1, and the first network device corresponds to a CU 1 and a DU 1; and the cell served by the second network device is a cell 2, the cell 2 is a serving cell of UE 2, and the second network device corresponds to a CU 2 and a DU 2.

For example, the DU 1 exchanges the configuration of the first additional reference signal of the cell 1 to the CU 1 through an F1 interface. Then, the CU 1 exchanges the configuration of the first additional reference signal to the CU 2 through an Xn interface or an X2 interface. After obtaining the configuration of the first additional reference signal of the cell 1, the CU 2 configures a measurement configuration for the UE 2, where the measurement configuration configured for the UE 2 includes a measurement configuration (where the measurement configuration is generated with reference to the configuration of the first additional reference signal) of the neighboring cell CU 1. The UE 2 may measure the cell 1 based on the measurement configuration.

This application further provides an embodiment. Network devices may exchange channel state information reference signal (CSI-RS) configurations, to configure a terminal device to measure a CSI-RS of a neighboring cell.

Figure 5:
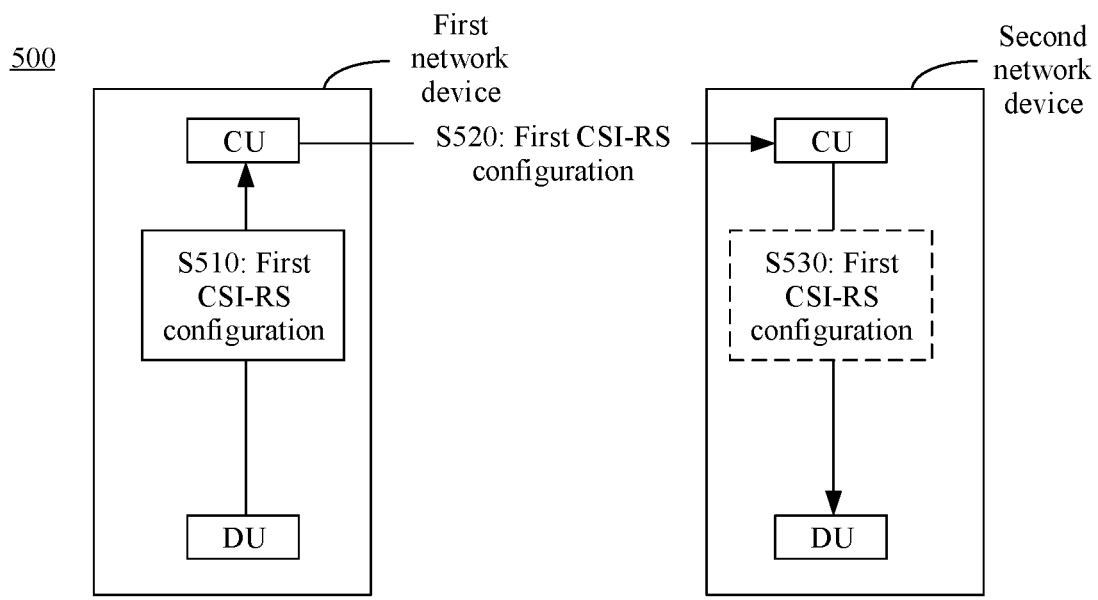
FIG. 5 is a schematic flowchart of a cell measurement method according to another embodiment of this application.

FIG. 5 is a schematic flowchart of a cell measurement method 500 according to still another embodiment of this application. As shown in FIG. 5, the method 500 includes the following steps.

S510: A DU of a first network device sends a first channel state information reference signal (CSI-RS) configuration to a CU of the first network device.

For example, the first CSI-RS configuration includes one or more of the following: an index of a CSI-RS resource, frequency information of the CSI-RS resource, time domain information (for example, a sending slot and cycle) of a CSI-RS, a density of the CSI-RS resource, an associated SSB, a start position of an OFDM symbol (firstOFDMSymbolInTimeDomatin), a sequence (sequenceGenerationConfig) used for scrambling, and the like.

S520: The CU of the first network device sends the first CSI-RS configuration to a CU of a second network device. Correspondingly, the CU of the second network device receives the first CSI-RS configuration from the CU of the first network device.

Optionally, the method 500 further includes: S530: The CU of the second network device sends the first CSI-RS configuration to a DU of the second network device. Herein, for the second network device, the first CSI-RS configuration is a CSI-RS configuration of a neighboring cell of a cell served by the second network device. The CU of the second network device may send the CSI-RS configuration of the neighboring cell to the DU of the second network device.

Optionally, the method 500 further includes: The DU of the second network device sends a second CSI-RS configuration to the CU of the second network device, and the CU of the second network device sends the second CSI-RS configuration to the CU of the first network device. Correspondingly, the CU of the first network device receives the second CSI-RS configuration from the CU of the second network device. In other words, the second network device may also exchange the second CSI-RS configuration of the second network device to the first network device.

Optionally, the CU of the first network device sends the second CSI-RS configuration to the DU of the first network device. Herein, for the first network device, the second CSI-RS configuration is a configuration of an additional reference signal of a neighboring cell of a cell served by the first network device. The CU of the first network device may send a CSI-RS configuration of the neighboring cell to the DU of the first network device. When generating a measurement gap configuration, the DU of the first network device may consider the CSI-RS configuration of the neighboring cell. The DU of the first network device may send the generated gap configuration to the CU of the first network device. For a process in which the DU of the first network device generates the gap configuration, refer to an existing means. To avoid redundancy, details are not described herein again.

For ease of understanding, the following provides descriptions with reference to a specific example. Herein, descriptions are provided by using an example in which the cell served by the first network device is a cell 1, the cell 1 is a serving cell of UE 1, and the first network device corresponds to a CU 1 and a DU 1; and the cell served by the second network device is a cell 2, the cell 2 is a serving cell of UE 2, and the second network device corresponds to a CU 2 and a DU 2.

For example, the DU 1 exchanges the first CSI-RS configuration of the cell 1 to the CU 1 through an F1 interface. Then, the CU 1 exchanges the first CSI-RS configuration to the CU 2 through an Xn interface or an X2 interface. After obtaining the first CSI-RS configuration of the cell 1, the CU 2 configures a measurement configuration for the UE 2, where the measurement configuration configured for the UE 2 includes a measurement configuration (where the measurement configuration is generated with reference to the first CSI-RS configuration) of the neighboring cell CU 1. The UE 2 may measure the cell 1 based on the measurement configuration.

This application further provides an embodiment. A CU of a network device sends a cell group configuration (CG-Config) information element (IE) to a DU of the network device.

Optionally, the CG-Config information element may include one or more of the following: a cell configuration of an SCG, a radio bearer (RB) configuration of the SCG, a discontinuous reception (DRX) configuration of the SCG, a candidate cell list of an SN, a measurement configuration of the SN, a band combination selected by the SN, frequency information of the SN, maximum power that can be used by UE in an SCG serving cell and that is requested by the SN from an MN, and the like.

Optionally, the CG-Config information element may be carried in a CU to DU RRC Information information element. In other words, the CU of the network device sends the CU to DU RRC Information to the DU of the network device, where the CU to DU RRC Information information element includes the CG-Config information element.

For example, in an NE-DC scenario and an NR-DC scenario, the CU of the network device sends the CG-Config configuration to the DU of the network device, so that the DU of the network device obtains related information such as a DRX configuration, a band combination configuration, and a power configuration of the SN, to perform corresponding processing. The NE-DC is E-UTRA NR dual connectivity, and the NR-DC is NR-NR dual connectivity.

It should be understood that the solution in which "a CU of a network device sends a CG-Config information element to a DU of the network device" provided in this embodiment may be implemented separately, or may be combined with the foregoing embodiments based on internal logic. This is not limited in this application.

This application further provides an embodiment. A DU of a network device sends, to a CU of the network device, a maximum value that is requested by an SN and that is of a reference quantity of cells for PDCCH blind detection allowed to be configured for an SCG (requestedPDCCH-BlindDetectionSCG).

A value of the requestedPDCCH-BlindDetectionSCG information element may be an integer. For example, the value of the requestedPDCCH-BlindDetectionSCG may be any value from 1 to 15.

Optionally, the requestedPDCCH-BlindDetectionSCG information element may be carried in a DU to CU RRC Information information element. In other words, the CU of the network device sends the DU to CU RRC Information information element to the DU of the network device, where the DU to CU RRC Information information element includes the requestedPDCCH-BlindDetectionSCG information element.

For example, in an NR-DC scenario, the DU of the network device sends the requestedPDCCH-BlindDetectionSCG information element to the CU of the network device, so that the DU obtains a capability of configuring new PDCCH blind detection.

It should be understood that the method in which "the DU of the network device exchanges the requestedPDCCH-BlindDetectionSCG to the CU of the network device" provided in this embodiment may be implemented separately, or may be combined with the foregoing embodiments based on internal logic. This is not limited in this application.

This application further provides an embodiment. A DU of a network device exchanges, to a CU of the network device, a maximum value that is requested by an MN and that is of a reference quantity of cells for PDCCH blind detection allowed to be configured for an MCG (requestedPDCCH-BlindDetectionMCG) information element.

Optionally, a value of the requestedPDCCH-BlindDetectionMCG information element may be an integer. For example, the value of the requestedPDCCH-BlindDetectionMCG information element may be any value from 1 to 15.

Optionally, the requestedPDCCH-BlindDetectionMCG information element may be carried in a DU to CU RRC Information information element.

For example, in an NR-DC scenario, the DU of the network device sends the requestedPDCCH-BlindDetectionMCG information element to the CU, so that the DU obtains a capability of configuring new PDCCH blind detection.

It should be understood that the solution in which the DU exchanges the requestedPDCCH-BlindDetectionMCG to the CU provided in this embodiment may be implemented separately from the foregoing embodiments, or may be combined with the foregoing embodiments based on internal logic. This is not limited in this application.

It should be further understood that the embodiments of this application may be appropriately combined for use, and explanations or descriptions of the terms in the embodiments may be mutually referenced or explained in the embodiments. This is not limited.

It should further be understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of the embodiments of this application.

The cell measurement methods according to the embodiments of this application are described in detail above with reference to FIG. 1 to FIG. 5. Cell measurement apparatuses according to the embodiments of this application are described below with reference to FIG. 6 to FIG. 8. It should be understood that the technical features described in the method embodiments are also applicable to the following apparatus embodiments.

Figure 6:
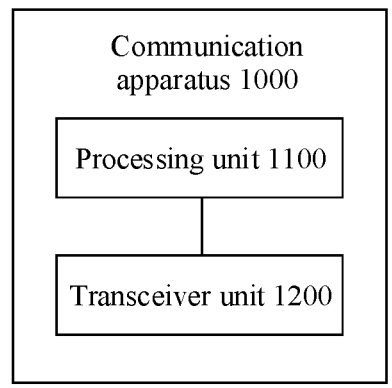
FIG. 6 is a schematic block diagram of a communication apparatus according to an embodiment of this application.

FIG. 6 is a schematic block diagram of a communication apparatus according to an embodiment of this application. As shown in FIG. 6, the communication apparatus 1000 may include a processing unit 1100 and a transceiver unit 1200.

In a possible design, the communication apparatus 1000 may correspond to the first network device in the foregoing method embodiments. For example, the communication apparatus 1000 may be the first network device or a chip configured in the first network device.

Specifically, the communication apparatus 1000 may correspond to the first network device in the method 300 according to the embodiments of this application. The communication apparatus 1000 may include units configured to perform the method performed by the first network device in the method 300 in FIG. 3, units for performing the method performed by the first network device in the method 400 in FIG. 4, or units for performing the method performed by the first network device in the method 500 in FIG. 5. In addition, the units in the communication apparatus 1000 and the foregoing other operations or functions are separately used to implement corresponding procedures of the first network device in the method 300 in FIG. 3, implement corresponding procedures of the first network device in the method 400 in FIG. 4, or implement corresponding procedures of the first network device in the method 500 in FIG. 5.

In a possible implementation, the processing unit 1100 is configured to obtain a first paging parameter of a cell served by a second network device, where the first paging parameter is used to indicate a first time domain position at which a terminal device monitors a paging message from the second network device.

The processing unit 1100 is further configured to invoke, based on the first paging parameter, the transceiver unit 1200 to send a reference signal, where a time domain position of the reference signal is determined based on the first time domain position.

Optionally, that the processing unit 1100 is configured to obtain a first paging parameter of a cell served by a second network device includes:

invoking the transceiver unit 1200 to receive the first paging parameter from the second network device.

Optionally, that the processing unit 1100 is configured to obtain a first paging parameter of a cell served by a second network device includes:

receiving the first paging parameter from the terminal device.

Optionally, the transceiver unit 1200 is further configured to send configuration information to the terminal device, where the configuration information is used to configure the terminal device to report the first paging parameter.

Optionally, the configuration information includes an identifier and/or frequency of the cell served by the second network device.

Optionally, the apparatus 1000 is a first network device, and the first network device further includes a distributed unit DU and a centralized unit CU, where the DU of the first network device sends a second paging parameter of a cell served by the first network device to the CU of the first network device.

In another possible implementation, the apparatus 1000 is a second network device, and the second network device includes the processing unit 1100 and the transceiver unit 1200.

The processing unit 1100 is configured to generate a first paging parameter of a cell served by the second network device, where the first paging parameter is used to indicate a first time domain position at which a terminal device monitors a paging message from the second network device.

The transceiver unit 1200 is configured to send the first paging parameter to a first network device, where the first paging parameter is used by the first network device to send a reference signal based on the first paging parameter, and a time domain position of the reference signal is determined based on the first time domain position.

Optionally, the second network device further includes a distributed unit DU and a centralized unit CU, where the DU of the second network device sends the first paging parameter to the CU of the second network device.

In still another possible implementation, the apparatus 1000 is a first network device, and the first network device includes a distributed unit and a centralized unit (not shown in the figure). The distributed unit DU of the first network device is configured to send a first channel state information reference signal (CSI-RS) configuration to the centralized unit CU of the first network device. The CU of the first network device is further configured to send the first CSI-RS configuration to a CU of a second network device by using the transceiver unit 1200.

Optionally, the CU of the first network device is further configured to receive a second CSI-RS configuration from the CU of the second network device by using the transceiver unit 1200; and send the second CSI-RS configuration to the DU of the first network device.

In still another possible implementation, the apparatus 1000 is a first network device. The processing unit 1100 is configured to determine a configuration of a first additional reference signal, where the configuration of the first additional reference signal includes time domain information and/or frequency domain information. The transceiver unit 1200 is configured to send the configuration of the first additional reference signal to a second network device.

Optionally, the first network device includes a distributed unit DU and a centralized unit CU (not shown in the figure). The distributed unit DU of the first network device sends the configuration of the first additional reference signal to the centralized unit CU of the first network device.

Optionally, the CU of the first network device is further configured to receive a configuration of a second additional reference signal from a CU of the second network device; and send the configuration of the second additional reference signal to the DU of the first network device.

In another possible implementation, the apparatus 1000 is a second network device. The transceiver unit is configured to receive a configuration of a first additional reference signal from a first network device, where the configuration of the first additional reference signal includes frequency domain information and/or time domain information. In this way, the second network device may configure, with reference to the configuration of the first additional reference channel, a terminal device to measure a neighboring cell.

Optionally, the second network device includes a distributed unit DU and a centralized unit CU (not shown in the figure). The centralized unit CU of the second network device is configured to send the configuration of the first additional reference signal to the distributed unit DU of the second network device.

Optionally, the distributed unit DU of the second network device is configured to send a configuration of a second additional reference signal to the centralized unit CU of the second network device.

It should be understood that a specific process in which the units perform the foregoing corresponding steps has been described in detail in the foregoing method embodiments. For brevity, details are not described herein again.

Figure 7:
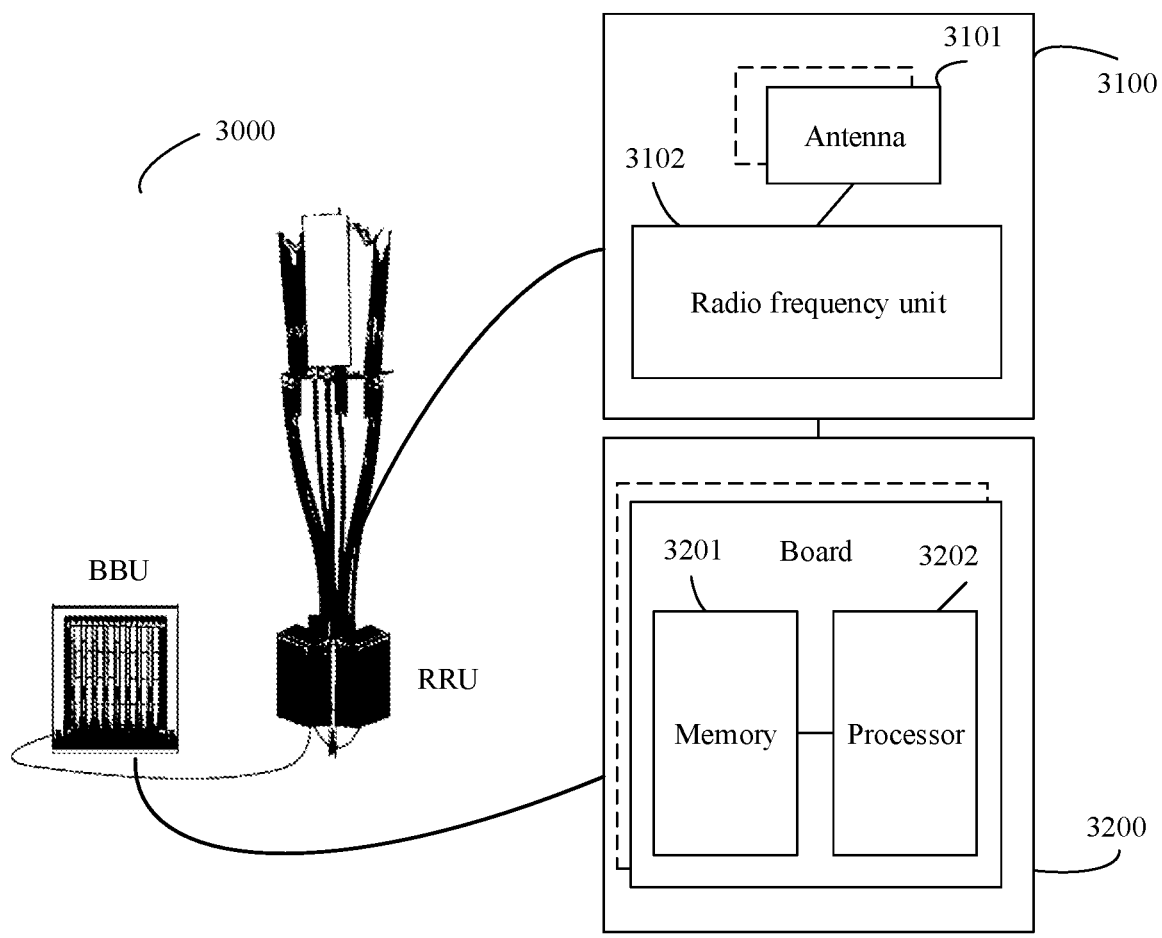
FIG. 7 is a schematic diagram of a structure of a network device according to an embodiment of this application.

It should be further understood that, when the communication apparatus 1000 is a network device (the first network device or the second network device), the transceiver unit 1200 in the communication apparatus 1000 may correspond to a transceiver 3200 in a network device 3000 shown in FIG. 7, and the processing unit 1100 in the communication apparatus 1000 may correspond to a processor 3100 in the network device 3000 shown in FIG. 7.

It should be further understood that, when the communication apparatus 1000 is a chip configured in the network device, the transceiver unit 1200 in the communication apparatus 1000 may be an input/output interface.

In a possible design, the communication apparatus 1000 may correspond to the terminal device in the foregoing method embodiments. For example, the communication apparatus 1000 may be the terminal device or a chip configured in the terminal device.

Specifically, the communication apparatus 1000 may correspond to the terminal device in the method 300 according to the embodiments of this application. The communication apparatus 1000 may include units configured to perform the method performed by the terminal device in the method 300 in FIG. 3, units for performing the method performed by the terminal device in the method 400 in FIG. 4, or units for performing the method performed by the terminal device in the method 500 in FIG. 5. In addition, the units in the communication apparatus 1000 and the foregoing other operations or functions are separately used to implement corresponding procedures of the terminal device in the method 300 in FIG. 3, implement corresponding procedures of the terminal device in the method 400 in FIG. 4, or implement corresponding procedures of the terminal device in the method 500 in FIG. 5.

In a possible implementation, the processing unit 1100 is configured to obtain a first paging parameter of a cell served by a second network device, where the first paging parameter is used to indicate a first time domain position at which a terminal device monitors a paging message from the second network device. The transceiver unit 1200 is configured to send the first paging parameter to a first network device.

Optionally, the transceiver unit 1200 is further configured to receive configuration information from the first network device, where the configuration information is used to configure the terminal device to report the first paging parameter.

Optionally, the configuration information includes an identifier and/or frequency of the cell served by the second network device.

It should be understood that a specific process in which the units perform the foregoing corresponding steps has been described in detail in the foregoing method embodiments. For brevity, details are not described herein again.

Figure 8:
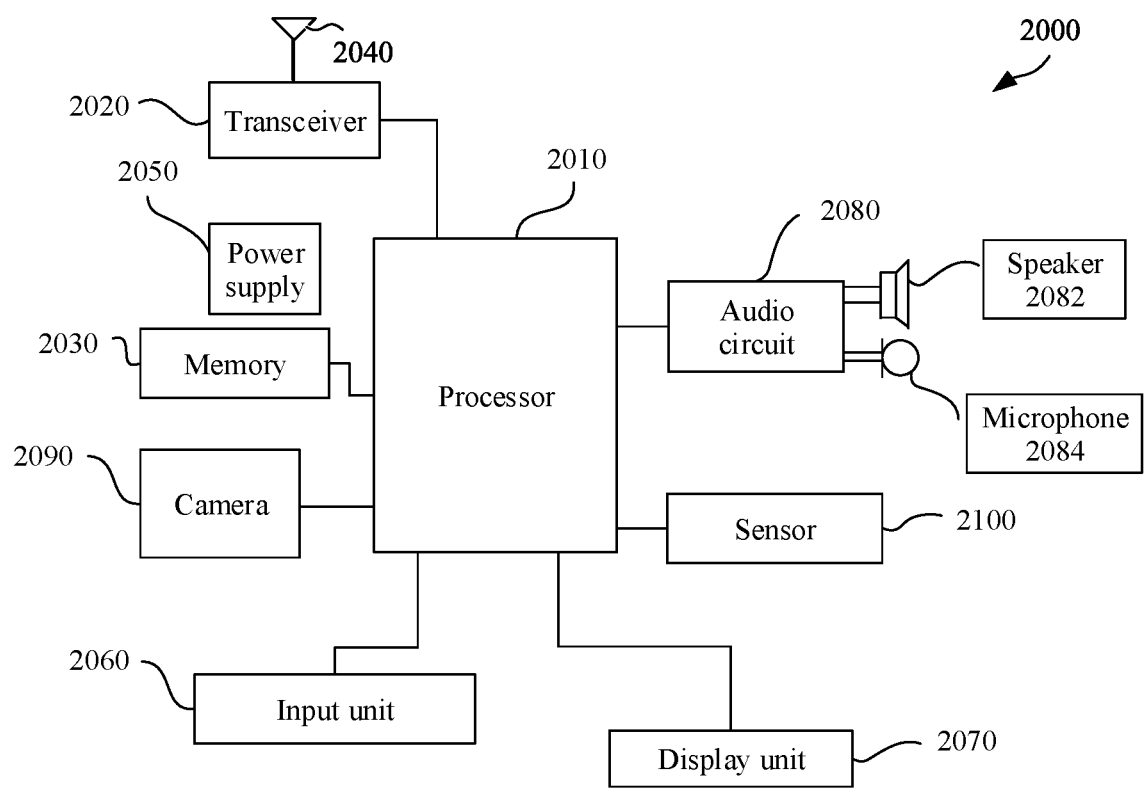
FIG. 8 is a schematic diagram of a structure of a terminal device according to an embodiment of this application.

It should be further understood that, when the communication apparatus 1000 is the terminal device, the transceiver unit 1200 in the communication apparatus 1000 may correspond to a transceiver 2020 in a terminal device 2000 shown in FIG. 8, and the processing unit 1100 in the communication apparatus 1000 may correspond to a processor 2010 in the terminal device 2000 shown in FIG. 8.

It should be further understood that, when the communication apparatus 1000 is a chip configured in the terminal device, the transceiver unit 1200 in the communication apparatus 1000 may be an input/output interface.

FIG. 7 is a schematic diagram of a structure of a network device according to an embodiment of this application, for example, a schematic diagram of a structure of a base station. The base station 3000 may be used in the system shown in FIG. 1 or FIG. 2, to perform functions of the network device in the foregoing method embodiments. As shown in the figure, the base station 3000 may include one or more radio frequency units such as remote radio units (remote radio unit, RRU) 3100 and one or more baseband units (BBU) (which may also be referred to as distributed units (DU)) 3200. The RRU 3100 may be referred to as a transceiver unit or a communication unit, and corresponds to the transceiver unit 1200 in FIG. 6. Optionally, the transceiver unit 3100 may also be referred to as a transceiver, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 3100 is mainly configured to send and receive radio frequency signals and perform conversion between a radio frequency signal and a baseband signal. The BBU 3200 is mainly configured to perform baseband processing, control the base station, and so on. The RRU 3100 and the BBU 3200 may be physically disposed together, or may be physically disposed separately, that is, the base station is a distributed base station.

The BBU 3200 is a control center of the base station. The BBU 3200 may also be referred to as a processing unit and correspond to the processing unit 1100 in FIG. 6. The BBU 3200 is mainly configured to implement a baseband processing function, for example, channel coding, multiplexing, modulation, and spreading. For example, the BBU (the processing unit) may be configured to control the base station to perform an operation procedure related to the network device in the foregoing method embodiments, for example, to generate configuration information for CSI reporting.

In an example, the BBU 3200 may include one or more boards. A plurality of boards may jointly support a radio access network (for example, an LTE network) having a single access standard, or may separately support radio access networks (for example, the LTE network, a 5G network, or another network) having different access standards. The BBU 3200 further includes a memory 3201 and a processor 3202. The memory 3201 is configured to store necessary instructions and data. The processor 3202 is configured to control the base station to perform a necessary action, for example, is configured to control the base station to perform the operation procedure related to the network device in the foregoing method embodiments. The memory 3201 and the processor 3202 may serve one or more boards. In other words, the memory and the processor may be disposed on each board. Alternatively, the plurality of boards may share a same memory and processor. In addition, a necessary circuit may be further disposed on each board.

It should be understood that the base station 3000 shown in FIG. 7 can implement the processes related to the network device in the method embodiments in FIG. 3 to FIG. 5. Operations or functions of the modules in the base station 3000 are respectively intended to implement corresponding procedures in the foregoing method embodiments. For details, refer to the descriptions in the foregoing method embodiments. To avoid repetition, detailed descriptions are properly omitted herein.

The BBU 3200 may be configured to perform an action implemented inside the network device in the foregoing method embodiments, and the RRU 3100 may be configured to perform an action of sending by the network device to the terminal device or receiving from the terminal device in the foregoing method embodiments. For details, refer to the descriptions in the foregoing method embodiments. Details are not described herein again.

FIG. 8 is a schematic diagram of a structure of a terminal device 2000 according to an embodiment of this application. The terminal device 2000 may be used in the system shown in FIG. 1 or FIG. 2, to perform functions of the terminal device in the foregoing method embodiments. As shown in FIG. 8, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal or a data signal. The memory 2030 is configured to store a computer program. The processor 2010 is configured to invoke the computer program from the memory 2030 and run the computer program, to control the transceiver 2020 to send and receive signals. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit 1100 in FIG. 6.

The transceiver 2020 may correspond to the communication unit in FIG. 6 that may also be referred to as the transceiver unit 1200. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that, the terminal device 2000 shown in FIG. 8 can implement the processes related to the terminal device in the method embodiments in FIG. 3 to FIG. 5. Operations or functions of the modules in the terminal device 2000 are respectively intended to implement corresponding procedures in the foregoing method embodiments. For details, refer to the descriptions in the foregoing method embodiments. To avoid repetition, detailed descriptions are properly omitted herein.

The processor 2010 may be configured to perform an action implemented inside the terminal device in the foregoing method embodiments, and the transceiver 2020 may be configured to perform an action of sending by the terminal device to the network device or receiving from the network device in the foregoing method embodiments. For details, refer to the descriptions in the foregoing method embodiments. Details are not described herein again.

Optionally, the terminal device 2000 may further include a power supply 2050, configured to supply power to components or circuits in the terminal device.

In addition, to improve functions of the terminal device, the terminal device 2000 may further include one or more of an input unit 2060, a display unit 2070, an audio circuit 2080, a camera 2090, a sensor 2100, and the like. The audio circuit may further include a speaker 2082, a microphone 2084, and the like.

According to the methods provided in the embodiments of this application, this application further provides a computer program product, and the computer program product includes computer program code. When the computer program code is run on a computer, the computer is enabled to perform the methods on the terminal device side in the embodiments shown in FIG. 3 to FIG. 5.

According to the methods provided in the embodiments of this application, this application further provides a computer-readable medium. The computer-readable medium stores program code. When the program code is run on a computer, the computer is enabled to perform the methods on the first network device side in the embodiments shown in FIG. 3 to FIG. 5.

According to the methods provided in the embodiments of this application, this application further provides a computer-readable medium. The computer-readable medium stores program code. When the program code is run on a computer, the computer is enabled to perform the methods on the second network device side in the embodiments shown in FIG. 3 to FIG. 5.

According to the methods provided in the embodiments of this application, this application further provides a system, including the foregoing one or more terminal devices and one or more network devices (the first network device or the second network device).

An embodiment of this application further provides a processing apparatus, including a processor and an interface. The processor is configured to perform the communication method in any one of the foregoing method embodiments.

It should be understood that the processing apparatus may be a chip. For example, the processing apparatus may be a field programmable gate array (FPGA), may be a general purpose processor, a digital signal processor (DSP), an application specific integrated circuit (ASIC), a field programmable gate array (FPGA) or another programmable logic device, a discrete gate or a transistor logic device, a discrete hardware component, may be a system on chip (SoC), may be a central processing unit (central processor unit, CPU), may be a network processor (NP), may be a digital signal processing circuit (digital signal processor, DSP), may be a micro controller unit (MCU), and may be a programmable controller (PLD) or another integrated chip. The processing apparatus may implement or perform the method, the steps, and logical block diagrams that are disclosed in the embodiments of this application. The general-purpose processor may be a microprocessor, or the processor may be any conventional processor, or the like. Steps of the methods disclosed with reference to the embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor.

It may be understood that the memory in the embodiments of this application may be a volatile memory or a nonvolatile memory, or may include both the volatile memory and the nonvolatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct Rambus RAM, DR RAM). It should be noted that the memory in the system and method described in this specification includes but is not limited to these and any memory of another appropriate type.

All or some of the foregoing embodiments may be implemented by using software, hardware, firmware, or any combination thereof. When being implemented by using the software, all or some of the methods may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the terminal device or network device in the method embodiments. A corresponding module or unit performs a corresponding step. For example, a communication unit (a transceiver) performs a receiving or sending step in the method embodiments, and a processing unit (a processor) performs another step other than the sending or receiving step. For a function of a specific unit, refer to a corresponding method embodiment. There may be one or more processors.

Terms such as "component", "module", and "system" used in this specification are used to indicate a computer-related entity, hardware, firmware, a combination of hardware and software, software, or software being executed. For example, a component may be, but is not limited to, a process that is run on a processor, the processor, an object, an executable file, a thread of execution, a program, or a computer. As illustrated by using the figures, both a computing device and an application that runs on the computing device may be components. One or more components may reside within a process or a thread of execution, and a component may be located on one computer or distributed between two or more computers. In addition, these components may be executed by various computer-readable media that store various data structures. For example, the components may communicate by using a local or remote process based on a signal having one or more data packets (for example, data from two components interacting with another component in a local system, in a distributed system, or across a network such as the internet interacting with another system by using the signal).

It should be understood that "an embodiment" mentioned in the entire specification means that particular features, structures, or characteristics related to the embodiment are included in at least one embodiment of this application. Therefore, the embodiments in the entire specification are not necessarily same embodiments. In addition, these particular features, structures, or characteristics may be combined in one or more embodiments in any appropriate manner.

It should be understood that, in the embodiments of this application, numbers "first", "second", and the like are merely used to distinguish between different objects, for example, to distinguish between different network devices, and do not constitute a limitation on the scope of the embodiments of this application. The embodiments of this application are not limited thereto.

It should be further understood that, in this application, "when" and "if" mean that a network element performs corresponding processing in an objective situation, and are not intended to limit time, and the network element is not necessarily required to have a determining action during implementation, and do not mean any other limitation.

It should be further understood that in the embodiments of this application, "B corresponding to A" indicates that B is associated with A, and B may be determined based on A. However, it should be further understood that determining A based on B does not mean that B is determined based only on A. That is, B may also be determined based on A and/or other information.

It should also be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that, in the embodiments of this application, the terminal device and/or the network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all operations in the embodiments of this application may be performed.

A person of ordinary skill in the art may be aware that, in combination with the examples described in the embodiments disclosed in this specification, units and algorithm steps can be implemented by electronic hardware or a combination of computer software and the electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A cell measurement method, comprising:
   obtaining, by a first network device, a first paging parameter of a cell served by a second network device, wherein the first paging parameter is used to indicate a first time domain position at which a terminal device monitors a paging message from the second network device; and
   sending, by the first network device, a reference signal based on the first paging parameter, wherein a time domain position of the reference signal is determined based on the first time domain position.

2. The cell measurement method according to claim 1, wherein the obtaining, by a first network device, a first paging parameter of a cell served by a second network device comprises:
   receiving, by the first network device, the first paging parameter from the second network device.

3. The cell measurement method according to claim 1, wherein the obtaining, by a first network device, a first paging parameter of a cell served by a second network device comprises:
   receiving, by the first network device, the first paging parameter from the terminal device.

4. The cell measurement method according to claim 3, wherein before the receiving, by the first network device, the first paging parameter from the terminal device, the cell measurement method further comprises:
   sending, by the first network device, configuration information to the terminal device, wherein the configuration information is used to configure the terminal device to report the first paging parameter.

5. The cell measurement method according to claim 4, wherein the configuration information comprises at least one of an identifier or a frequency of the cell served by the second network device.

6. The cell measurement method according to claim 1, wherein the method further comprises:
   sending, by a distributed unit (DU) of the first network device, a second paging parameter of a cell served by the first network device to a centralized unit (CU) of the first network device.

7. A cell measurement apparatus, comprising:
   at least one processor; and
   one or more memories coupled to the at least one processor and storing programming instructions for execution by the at least one processor to:
   obtain a first paging parameter of a cell served by a second network device, wherein the first paging parameter is used to indicate a first time domain position at which a terminal device monitors a paging message from the second network device; and
   send a reference signal based on the first paging parameter, wherein a time domain position of the reference signal is determined based on the first time domain position.

8. The cell measurement apparatus according to claim 7, wherein the obtain a first paging parameter of a cell served by a second network device comprises:
   receive the first paging parameter from the second network device.

9. The cell measurement apparatus according to claim 7, wherein the obtain a first paging parameter of a cell served by a second network device comprises:

receive the first paging parameter from the terminal device.

10. The cell measurement apparatus according to claim 9, wherein the one or more memories store the programming instructions for execution by the at least one processor to:

send configuration information to the terminal device, wherein the configuration information is used to configure the terminal device to report the first paging parameter.

11. The cell measurement apparatus according to claim 10, wherein the configuration information comprises at least one of an identifier or a frequency of the cell served by the second network device.

12. The cell measurement apparatus according to claim 7, wherein the cell measurement apparatus is a first network device, and the first network device further comprises a distributed unit (DU) and a centralized unit (CU), wherein the DU of the first network device sends a second paging parameter of a cell served by the first network device to the CU of the first network device.

13. A cell measurement apparatus, comprising:
at least one processor; and
one or more memories coupled to the at least one processor and storing programming instructions for execution by the at least one processor to:
obtain a first paging parameter of a cell served by a second network device, wherein the first paging parameter is used to indicate a first time domain position at which the cell measurement apparatus monitors a paging message from the second network device; and
send the first paging parameter to a first network device.

14. The cell measurement apparatus according to claim 13, wherein one or more memories store the programming instructions for execution by the at least one processor to:
receive configuration information from the first network device, wherein the configuration information is used to configure the cell measurement apparatus to report the first paging parameter.

15. The cell measurement apparatus according to claim 14, wherein the configuration information comprises at least one of an identifier or a frequency of the cell served by the second network device.

* * * * *